(12) United States Patent
Bachar (10) Patent No.: US 12,352,931 B2
(45) Date of Patent: Jul. 8, 2025

(54) FOLDED CAMERA WITH OPTICAL IMAGE STABILIZATION

(71) Applicant: Corephotonics Ltd., Tel Aviv (IL)

(72) Inventor: Gil Bachar, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/182,431

(22) Filed: Mar. 13, 2023

(65) Prior Publication Data

US 2023/0213737 A1 Jul. 6, 2023

Related U.S. Application Data

(63) Continuation of application No. 16/468,491, filed as application No. PCT/IB2019/050059 on Jan. 3, 2019, now Pat. No. 11,640,047.

(Continued)

(51) Int. Cl.
*G02B 13/00* (2006.01)
*G02B 7/04* (2021.01)
(Continued)

(52) U.S. Cl.
CPC ........... *G02B 13/0065* (2013.01); *G02B 7/04* (2013.01); *G02B 27/646* (2013.01); *G03B 5/00* (2013.01);
(Continued)

(58) Field of Classification Search
CPC .... G02B 13/0065; G02B 13/007; G02B 7/02; G02B 7/023; G02B 7/04; G02B 7/08;
(Continued)

(56) References Cited

U.S. PATENT DOCUMENTS 3,085,354 A 4/1963 Rasmussen et al.
3,584,513 A 6/1971 Gates
(Continued)

FOREIGN PATENT DOCUMENTS

CN 101276415 A 10/2008
CN 201514511 U 6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Marin Pichler
(74) *Attorney, Agent, or Firm* — Reinhold Cohn Group; Naomi Bollag; Elisheva Blecher (57) ABSTRACT

Folded digital camera comprising a lens having a lens optical axis, an image sensor and first and second optical path folding elements (OPFEs), in which the second OPFE is closest to the image sensor, wherein the lens is operative to move in a first direction substantially parallel to the lens optical axis and in a second direction substantially perpendicular to first and second optical paths, wherein the second OPFE is operative to move in the first direction, and wherein the combined motion of the lens and of the second OPFE is operative to provide focus and to compensate for tilts of the camera around the first and second directions.

11 Claims, 5 Drawing Sheets

Related U.S. Application Data (60) Provisional application No. 62/629,298, filed on Feb. 12, 2018.

(51) Int. Cl.
| | |
|---|---|
| *G02B 27/64* | (2006.01) |
| *G03B 5/00* | (2021.01) |
| *G03B 13/32* | (2021.01) |
| *H04N 23/55* | (2023.01) |
| *H04N 23/68* | (2023.01) |

(52) U.S. Cl.
CPC ............. *G03B 13/32* (2013.01); *H04N 23/55* (2023.01); *H04N 23/687* (2023.01); *G03B 2205/003* (2013.01)

(58) Field of Classification Search
CPC ... G02B 7/09; G02B 7/10; G02B 7/18; G02B 7/1805; G02B 7/182; G02B 27/64; G02B 27/646; G03B 5/00; G03B 5/02; G03B 5/04; G03B 5/32; G03B 5/34; G03B 5/36; G03B 2205/00; G03B 2205/0007; G03B 2205/0015; G03B 2205/003; G03B 2205/0046; G03B 2205/0053; G03B 2205/0061; G03B 2205/0069; H04N 5/2254; H04N 5/23287; H04N 5/2328; H04N 5/2326
USPC .......................... 359/555, 556, 557, 813, 814
See application file for complete search history.

(56) References Cited

U.S. PATENT DOCUMENTS

| | | | |
|---|---|---|---|
| 3,941,001 | A | 3/1976 | LaSarge |
| 4,199,785 | A | 4/1980 | McCullough et al. |
| 4,792,822 | A | 12/1988 | Akiyama et al. |
| 5,005,083 | A | 4/1991 | Grage et al. |
| 5,032,917 | A | 7/1991 | Aschwanden |
| 5,041,852 | A | 8/1991 | Misawa et al. |
| 5,051,830 | A | 9/1991 | von Hoessle |
| 5,099,263 | A | 3/1992 | Matsumoto et al. |
| 5,248,971 | A | 9/1993 | Mandl |
| 5,287,093 | A | 2/1994 | Amano et al. |
| 5,331,465 | A | 7/1994 | Miyano |
| 5,394,520 | A | 2/1995 | Hall |
| 5,436,660 | A | 7/1995 | Sakamoto |
| 5,444,478 | A | 8/1995 | Lelong et al. |
| 5,459,520 | A | 10/1995 | Sasaki |
| 5,502,537 | A | 3/1996 | Utagawa |
| 5,657,402 | A | 8/1997 | Bender et al. |
| 5,682,198 | A | 10/1997 | Katayama et al. |
| 5,768,443 | A | 6/1998 | Michael et al. |
| 5,892,855 | A | 4/1999 | Kakinami et al. |
| 5,926,190 | A | 7/1999 | Turkowski et al. |
| 5,940,641 | A | 8/1999 | McIntyre et al. |
| 5,982,951 | A | 11/1999 | Katayama et al. |
| 6,101,334 | A | 8/2000 | Fantone |
| 6,128,416 | A | 10/2000 | Oura |
| 6,148,120 | A | 11/2000 | Sussman |
| 6,201,533 | B1 | 3/2001 | Rosenberg et al. |
| 6,208,765 | B1 | 3/2001 | Bergen |
| 6,211,668 | B1 | 4/2001 | Duesler et al. |
| 6,215,299 | B1 | 4/2001 | Reynolds et al. |
| 6,222,359 | B1 | 4/2001 | Duesler et al. |
| 6,268,611 | B1 | 7/2001 | Pettersson et al. |
| 6,341,901 | B1 | 1/2002 | Iwasa et al. |
| 6,549,215 | B2 | 4/2003 | Jouppi |
| 6,611,289 | B1 | 8/2003 | Yu et al. |
| 6,643,416 | B1 | 11/2003 | Daniels et al. |
| 6,650,368 | B1 | 11/2003 | Doron |
| 6,680,748 | B1 | 1/2004 | Monti |
| 6,714,665 | B1 | 3/2004 | Hanna et al. |
| 6,724,421 | B1 | 4/2004 | Glatt |
| 6,738,073 | B2 | 5/2004 | Park et al. |
| 6,741,250 | B1 | 5/2004 | Furlan et al. |
| 6,750,903 | B1 | 6/2004 | Miyatake et al. |
| 6,778,207 | B1 | 8/2004 | Lee et al. |
| 7,002,583 | B2 | 2/2006 | Rabb, III |
| 7,015,954 | B1 | 3/2006 | Foote et al. |
| 7,038,716 | B2 | 5/2006 | Klein et al. |
| 7,199,348 | B2 | 4/2007 | Olsen et al. |
| 7,206,136 | B2 | 4/2007 | Labaziewicz et al. |
| 7,248,294 | B2 | 7/2007 | Slatter |
| 7,256,944 | B2 | 8/2007 | Labaziewicz et al. |
| 7,305,180 | B2 | 12/2007 | Labaziewicz et al. |
| 7,339,621 | B2 | 3/2008 | Fortier |
| 7,346,217 | B1 | 3/2008 | Gold, Jr. |
| 7,365,793 | B2 | 4/2008 | Cheatle et al. |
| 7,411,610 | B2 | 8/2008 | Doyle |
| 7,424,218 | B2 | 9/2008 | Baudisch et al. |
| 7,509,041 | B2 | 3/2009 | Hosono |
| 7,533,819 | B2 | 5/2009 | Barkan et al. |
| 7,619,683 | B2 | 11/2009 | Davis |
| 7,738,016 | B2 | 6/2010 | Toyofuku |
| 7,773,121 | B1 | 8/2010 | Huntsberger et al. |
| 7,809,256 | B2 | 10/2010 | Kuroda et al. |
| 7,880,776 | B2 | 2/2011 | LeGall et al. |
| 7,918,398 | B2 | 4/2011 | Li et al. |
| 7,964,835 | B2 | 6/2011 | Olsen et al. |
| 7,978,239 | B2 | 7/2011 | Deever et al. |
| 8,115,825 | B2 | 2/2012 | Culbert et al. |
| 8,149,327 | B2 | 4/2012 | Lin et al. |
| 8,154,610 | B2 | 4/2012 | Jo et al. |
| 8,238,695 | B1 | 8/2012 | Davey et al. |
| 8,274,552 | B2 | 9/2012 | Dahi et al. |
| 8,390,729 | B2 | 3/2013 | Long et al. |
| 8,391,697 | B2 | 3/2013 | Cho et al. |
| 8,400,555 | B1 | 3/2013 | Georgiev et al. |
| 8,439,265 | B2 | 5/2013 | Ferren et al. |
| 8,446,484 | B2 | 5/2013 | Muukki et al. |
| 8,483,452 | B2 | 7/2013 | Ueda et al. |
| 8,514,491 | B2 | 8/2013 | Duparre |
| 8,547,389 | B2 | 10/2013 | Hoppe et al. |
| 8,553,106 | B2 | 10/2013 | Scarff |
| 8,587,691 | B2 | 11/2013 | Takane |
| 8,619,148 | B1 | 12/2013 | Watts et al. |
| 8,752,969 | B1 | 6/2014 | Kane et al. |
| 8,803,990 | B2 | 8/2014 | Smith |
| 8,896,655 | B2 | 11/2014 | Mauchly et al. |
| 8,976,255 | B2 | 3/2015 | Matsuoto et al. |
| 9,019,387 | B2 | 4/2015 | Nakano |
| 9,025,073 | B2 | 5/2015 | Attar et al. |
| 9,025,077 | B2 | 5/2015 | Attar et al. |
| 9,041,835 | B2 | 5/2015 | Honda |
| 9,137,447 | B2 | 9/2015 | Shibuno |
| 9,185,291 | B1 | 11/2015 | Shabtay et al. |
| 9,215,377 | B2 | 12/2015 | Sokeila et al. |
| 9,215,385 | B2 | 12/2015 | Luo |
| 9,270,875 | B2 | 2/2016 | Brisedoux et al. |
| 9,286,680 | B1 | 3/2016 | Jiang et al. |
| 9,344,626 | B2 | 5/2016 | Silverstein et al. |
| 9,360,671 | B1 | 6/2016 | Zhou |
| 9,369,621 | B2 | 6/2016 | Malone et al. |
| 9,413,930 | B2 | 8/2016 | Geerds |
| 9,413,984 | B2 | 8/2016 | Attar et al. |
| 9,420,180 | B2 | 8/2016 | Jin |
| 9,438,792 | B2 | 9/2016 | Nakada et al. |
| 9,485,432 | B1 | 11/2016 | Medasani et al. |
| 9,578,257 | B2 | 2/2017 | Attar et al. |
| 9,618,748 | B2 | 4/2017 | Munger et al. |
| 9,681,057 | B2 | 6/2017 | Attar et al. |
| 9,723,220 | B2 | 8/2017 | Sugie |
| 9,736,365 | B2 | 8/2017 | Laroia |
| 9,736,391 | B2 | 8/2017 | Du et al. |
| 9,768,310 | B2 | 9/2017 | Ahn et al. |
| 9,800,798 | B2 | 10/2017 | Ravirala et al. |
| 9,851,803 | B2 | 12/2017 | Fisher et al. |
| 9,894,287 | B2 | 2/2018 | Qian et al. |
| 9,900,522 | B2 | 2/2018 | Lu |
| 9,927,600 | B2 | 3/2018 | Goldenberg et al. |
| 2002/0005902 | A1 | 1/2002 | Yuen |
| 2002/0030163 | A1 | 3/2002 | Zhang |

(56) References Cited

U.S. PATENT DOCUMENTS

| | | |
|---|---|---|
| 2002/0054214 A1 | 5/2002 | Yoshikawa |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0156751 A1 | 8/2003 | Lee et al. |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0239313 A1 | 12/2004 | Godkin |
| 2004/0240052 A1 | 12/2004 | Minefuji et al. |
| 2005/0013509 A1 | 1/2005 | Samadani |
| 2005/0046740 A1 | 3/2005 | Davis |
| 2005/0134697 A1 | 6/2005 | Mikkonen et al. |
| 2005/0141390 A1 | 6/2005 | Lee et al. |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2005/0248667 A1 | 11/2005 | Schweng et al. |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0126737 A1 | 6/2006 | Boice et al. |
| 2006/0170793 A1 | 8/2006 | Pasquarette et al. |
| 2006/0175549 A1 | 8/2006 | Miller et al. |
| 2006/0181619 A1 | 8/2006 | Liow et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0035631 A1 | 2/2007 | Ueda |
| 2007/0126911 A1 | 6/2007 | Nanjo |
| 2007/0127040 A1 | 6/2007 | Davidovici |
| 2007/0159344 A1 | 7/2007 | Kisacanin |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0088942 A1 | 4/2008 | Seo |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0102948 A1 | 4/2009 | Scherling |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0168135 A1 | 7/2009 | Yu et al. |
| 2009/0200451 A1 | 8/2009 | Conners |
| 2009/0219547 A1 | 9/2009 | Kauhanen et al. |
| 2009/0234542 A1 | 9/2009 | Orlewski |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0134621 A1 | 6/2010 | Namkoong et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0265331 A1 | 10/2010 | Tanaka |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0121666 A1 | 5/2011 | Park et al. |
| 2011/0128288 A1 | 6/2011 | Petrou et al. |
| 2011/0164172 A1 | 7/2011 | Shintani et al. |
| 2011/0221599 A1 | 9/2011 | Högasten |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0285714 A1 | 11/2011 | Swic et al. |
| 2011/0298966 A1 | 12/2011 | Kirschstein et al. |
| 2012/0014682 A1 | 1/2012 | David et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0148854 A1 | 6/2013 | Wang et al. |
| 2013/0155176 A1 | 6/2013 | Paripally et al. |
| 2013/0163085 A1 | 6/2013 | Lim et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0229544 A1 | 9/2013 | Bando |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0258048 A1 | 10/2013 | Wang et al. |
| 2013/0270419 A1 | 10/2013 | Singh et al. |
| 2013/0278785 A1 | 10/2013 | Nomura et al. |
| 2013/0286221 A1 | 10/2013 | Shechtman et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192224 A1 | 7/2014 | Laroia |

(56) References Cited

U.S. PATENT DOCUMENTS

| | | |
|---|---|---|
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2014/0376090 A1 | 12/2014 | Terajima |
| 2014/0379103 A1 | 12/2014 | Ishikawa et al. |
| 2015/0002683 A1 | 1/2015 | Hu et al. |
| 2015/0002684 A1 | 1/2015 | Kuchiki |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0110345 A1 | 4/2015 | Weichselbaum |
| 2015/0124059 A1 | 5/2015 | Georgiev et al. |
| 2015/0138381 A1 | 5/2015 | Ahn |
| 2015/0145965 A1 | 5/2015 | Livyatan et al. |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0198464 A1 | 7/2015 | El Alami |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154066 A1 | 6/2016 | Hioka et al. |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0238834 A1 | 8/2016 | Erlich et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0301868 A1 | 10/2016 | Acharya et al. |
| 2016/0342095 A1 | 11/2016 | Bieling et al. |
| 2016/0353008 A1 | 12/2016 | Osborne |
| 2016/0353012 A1 | 12/2016 | Kao et al. |
| 2016/0381289 A1 | 12/2016 | Kim et al. |
| 2017/0001577 A1 | 1/2017 | Seagraves et al. |
| 2017/0019616 A1 | 1/2017 | Zhu et al. |
| 2017/0070731 A1 | 3/2017 | Darling et al. |
| 2017/0094187 A1 | 3/2017 | Sharma et al. |
| 2017/0124987 A1 | 5/2017 | Kim et al. |
| 2017/0150061 A1 | 5/2017 | Shabtay et al. |
| 2017/0187962 A1* | 6/2017 | Lee ............... G02B 27/646 |
| 2017/0214846 A1 | 7/2017 | Du et al. |
| 2017/0214866 A1 | 7/2017 | Zhu et al. |
| 2017/0219749 A1 | 8/2017 | Hou et al. |
| 2017/0242225 A1 | 8/2017 | Fiske |
| 2017/0276954 A1 | 9/2017 | Bajorins et al. |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1* | 1/2018 | Goldenberg ........ H04N 23/45 |
| 2018/0059379 A1 | 3/2018 | Chou |
| 2018/0109660 A1 | 4/2018 | Yoon et al. |
| 2018/0109710 A1 | 4/2018 | Lee et al. |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0184010 A1 | 6/2018 | Cohen et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2018/0329281 A1 | 11/2018 | Ye |
| 2018/0368656 A1 | 12/2018 | Austin et al. |
| 2019/0100156 A1 | 4/2019 | Chung et al. |
| 2019/0121103 A1 | 4/2019 | Bachar et al. |
| 2019/0121216 A1 | 4/2019 | Shabtay et al. |
| 2019/0130822 A1 | 5/2019 | Jung et al. |
| 2019/0212632 A1* | 7/2019 | Miller .................. H04N 23/55 |
| 2019/0213712 A1 | 7/2019 | Lashdan et al. |
| 2019/0215440 A1 | 7/2019 | Rivard et al. |
| 2019/0222758 A1 | 7/2019 | Goldenberg et al. |
| 2019/0228562 A1 | 7/2019 | Song |
| 2019/0297238 A1 | 9/2019 | Klosterman |
| 2020/0103726 A1 | 4/2020 | Shabtay et al. |
| 2020/0104034 A1 | 4/2020 | Lee et al. |
| 2020/0134848 A1 | 4/2020 | El-Khamy et al. |
| 2020/0221026 A1 | 7/2020 | Fridman et al. |
| 2020/0264403 A1 | 8/2020 | Bachar et al. |
| 2020/0389580 A1 | 12/2020 | Kodama et al. |
| 2021/0180989 A1 | 6/2021 | Fukumura et al. |
| 2021/0333521 A9 | 10/2021 | Yedid et al. |
| 2022/0252963 A1 | 8/2022 | Shabtay et al. |

FOREIGN PATENT DOCUMENTS

| | | |
|---|---|---|
| CN | 102215373 A | 10/2011 |
| CN | 102739949 A | 10/2012 |
| CN | 102982518 A | 3/2013 |
| CN | 103024272 A | 4/2013 |
| CN | 203406908 U | 1/2014 |
| CN | 103841404 A | 6/2014 |
| CN | 205301703 U | 6/2016 |
| CN | 105827903 A | 8/2016 |
| CN | 105847662 A | 8/2016 |
| CN | 107608052 A | 1/2018 |
| CN | 107682489 A | 2/2018 |
| CN | 109729266 A | 5/2019 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004056779 A | 2/2004 |
| JP | 2004133054 A | 4/2004 |
| JP | 2004245982 A | 9/2004 |
| JP | 2005099265 A | 4/2005 |
| JP | 2005122084 A | 5/2005 |
| JP | 2005321592 A | 11/2005 |
| JP | 2006237914 A | 9/2006 |
| JP | 2006238325 A | 9/2006 |
| JP | 2007228006 A | 9/2007 |
| JP | 2007306282 A | 11/2007 |
| JP | 2008076485 A | 4/2008 |
| JP | 2008271026 A | 11/2008 |
| JP | 2010204341 A | 9/2010 |
| JP | 2011055246 A | 3/2011 |
| JP | 2011085666 A | 4/2011 |
| JP | 2011138407 A | 7/2011 |
| JP | 2011203283 A | 10/2011 |
| JP | 2012132739 A | 7/2012 |
| JP | 2013101213 A | 5/2013 |
| JP | 2013106289 A | 5/2013 |
| JP | 2016105577 A | 6/2016 |
| JP | 2017146440 A | 8/2017 |
| KR | 20070005946 A | 1/2007 |
| KR | 20090058229 A | 6/2009 |
| KR | 20100008936 A | 1/2010 |
| KR | 20110080590 A | 7/2011 |
| KR | 20130104764 A | 9/2013 |
| KR | 1020130135805 A | 11/2013 |
| KR | 20140014787 A | 2/2014 |
| KR | 101428042 B1 | 8/2014 |

(56) References Cited

FOREIGN PATENT DOCUMENTS

| KR | 101477178 B1 | 12/2014 |
|---|---|---|
| KR | 20140144126 A | 12/2014 |
| KR | 20150118012 A | 10/2015 |
| KR | 20170105236 A | 9/2017 |
| KR | 20180120894 A | 11/2018 |
| KR | 20130085116 A | 6/2019 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Office Action in related KR patent application 2023-7002897, dated Sep. 19, 2023.

* cited by examiner

FOLDED CAMERA WITH OPTICAL IMAGE STABILIZATION

CROSS REFERENCE TO RELATED APPLICATIONS

This application is a continuation of U.S. patent application Ser. No. 16/468,491 filed Jun. 11, 2019, which was a 371 application from international patent application No. PCT/IB2019/050059 filed Jan. 3, 2019, which claims the benefit of priority from U.S. Provisional patent application No. 62/629,298 filed Feb. 12, 2018, which is incorporated herein by reference in its entirety.

FIELD

Embodiments disclosed herein relate in general to digital cameras and in particular to folded digital cameras and dual folded-upright cameras incorporated in mobile electronic devices such as smartphones.

BACKGROUND

A typical digital camera includes an image sensor (or simply "sensor") and a lens. The lens forms an image on the sensor. A lens module may include several lens elements, typically assembled in one lens barrel. Folded cameras (FCs) and double-folded cameras (DFCs) are known, see for example co-owned international patent application PCT/IB2015/056004. Folded cameras include an additional optical path folding element (OPFE) that folds the light from object to lens.

The OPFE may be for example a prism or a mirror. Double-folded cameras include a second OPFE that folds the light from the lens to the image sensor. Such camera may have focus and auto-focus capabilities. FCs with optical image stabilization (OIS) capabilities are also known.

Folded cameras with a "distributed" (or 'split') lens are folded cameras in which one or more of the lens elements is installed in the optical path between an imaged object and the OPFE, while other lens elements are installed in the optical path between the OPFE and the image sensor (see e.g. the Asus ZenFone Zoom).

SUMMARY

In exemplary embodiments, there are provided digital cameras comprising: a lens having a lens optical axis, an image sensor, a first OPFE for folding light arriving from an object in a first optical path to a second optical path substantially aligned with the lens optical axis, and a second OPFE for folding light from the second optical path to a third optical path toward the image sensor, wherein the third optical path is substantially parallel with the first optical path, wherein the first and third optical paths are substantially orthogonal to the second optical path, wherein the lens is operative to move in a first direction substantially parallel to the lens optical axis and in a second direction substantially perpendicular to both the first and second optical paths, wherein the second OPFE is operative to move in the first direction, and wherein the combined motion of the lens and of the second OPFE is operative to provide focus and to compensate for tilts of the camera around the first and second directions. The first and second OPFEs may be prism, mirrors, or a prism and a mirror.

In some embodiments, the lens is fixedly attached to the first OPFE to form a lens-OPFE assembly.

In some embodiments, the lens is a folded lens.

In exemplary embodiments, there are provided methods for providing focus and optical image stabilization in a folded camera module that includes a first OPFE for folding light from a first optical path with a first optical axis to a second optical path with a second optical axis perpendicular to the first optical axis, a lens module carrying a lens with a symmetry axis parallel to the second optical axis, and a second OPFE for folding light from the second optical path to a third optical path, a method comprising moving the lens in a first direction substantially parallel to the lens optical axis and in a second direction substantially perpendicular to both the first and second optical paths, and moving the second OPFE in the first direction, wherein the combined motion of the lens and of the second OPFE is operative to provide focus and to compensate for tilts of the camera around the first and second directions.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way. In the drawings.

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods have not been described in detail so as not to obscure the presently disclosed subject matter.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), an application specific integrated circuit (ASIC), etc.) capable of executing various data processing operations.

Furthermore, for the sake of clarity the term "substantially" is used herein to imply the possibility of variations in values within an acceptable range. According to one example, the term "substantially" used herein should be interpreted to imply possible variation of up to 10% over or under any specified value. According to another example, the term "substantially" used herein should be interpreted to imply possible variation of up to 5% over or under any specified value. According to a further example, the term "substantially" used herein should be interpreted to imply possible variation of up to 2.5% over or under any specified value.

Figure 1A:
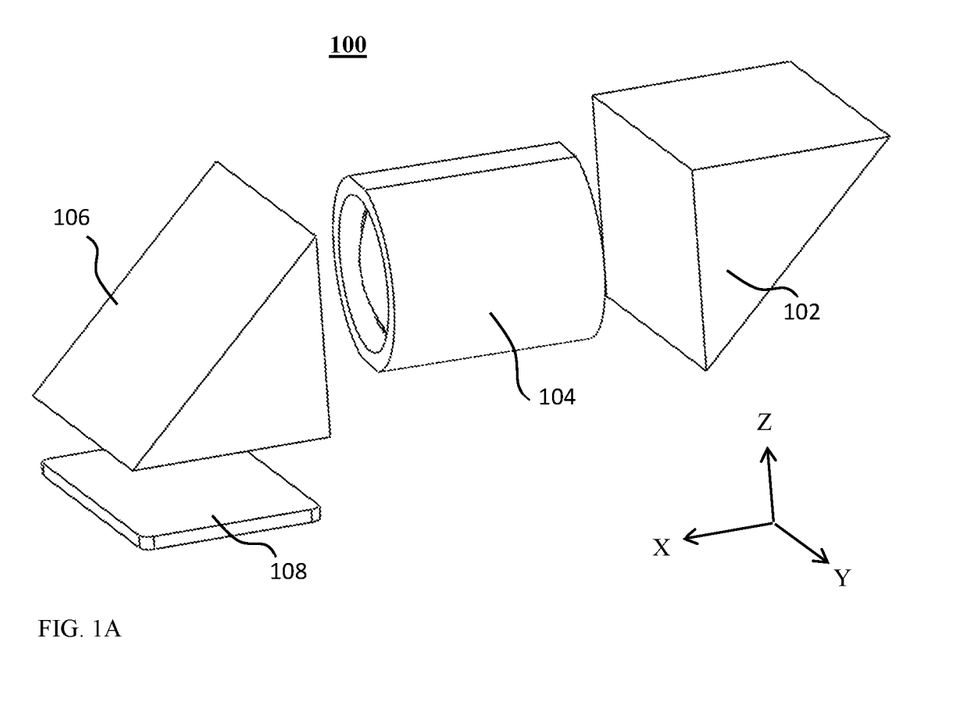
FIG. 1A shows schematically a double-folded camera (DFC) in a general perspective view, according to an example of the presently disclosed subject matter.
Figure 1B:
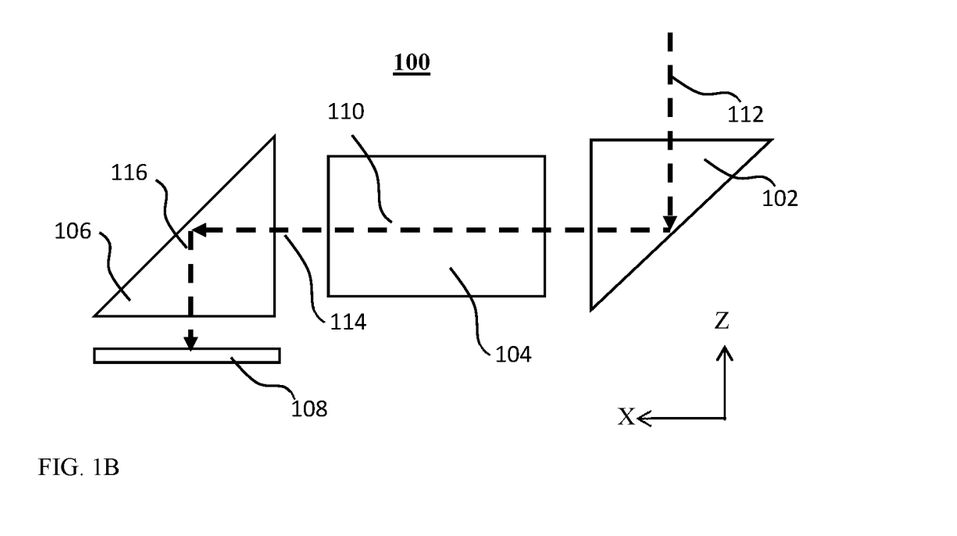
FIG. 1B shows the DFC of FIG. 1A from a side view.
Figure 1C:
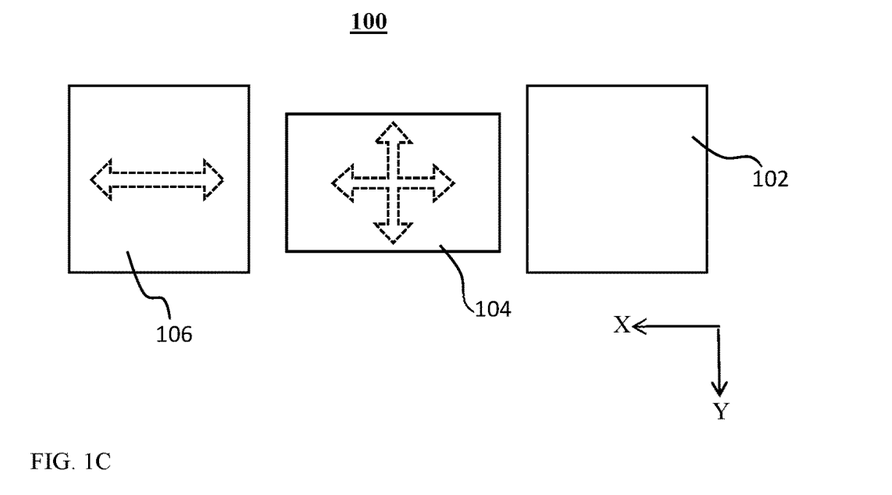
FIG. 1C shows the DFC of FIG. 1A from a top view.

FIGS. 1A, 1B and 1C show respectively schematic perspective, side and top views of a DFC numbered 100 according to an example of the presently disclosed subject matter. An orthogonal X-Y-Z coordinate ("axis") system shown applies also to all following drawings. This coordinate system is exemplary. DFC 100 includes a first OPFE 102 (here and exemplarily a prism), a lens 104, a second OPFE (here and exemplarily also a prism) 106 and an image sensor 108. In other embodiments, OPFEs 102 and 106 may be mirrors. Lens 104 has a lens optical axis 110. Lens 104 is characterized by a fixed effective focal length (EFL), as known in the art. EFL is measured in length units (micrometer (μm), millimeter (mm), or meter (m)). Optical axis 110 may also be referred to herein as "folded camera optical axis". Light arriving from an object (not shown) in a first optical path 112 is folded by first OPFE 102 to a second optical path 114 substantially aligned with optical axis 110, passes through lens 104, is folded again by second OPFE 106 to a third optical path 116, and impinges on sensor 108 to form an image. All optical paths are marked in FIG. 1B.

Figure 4:
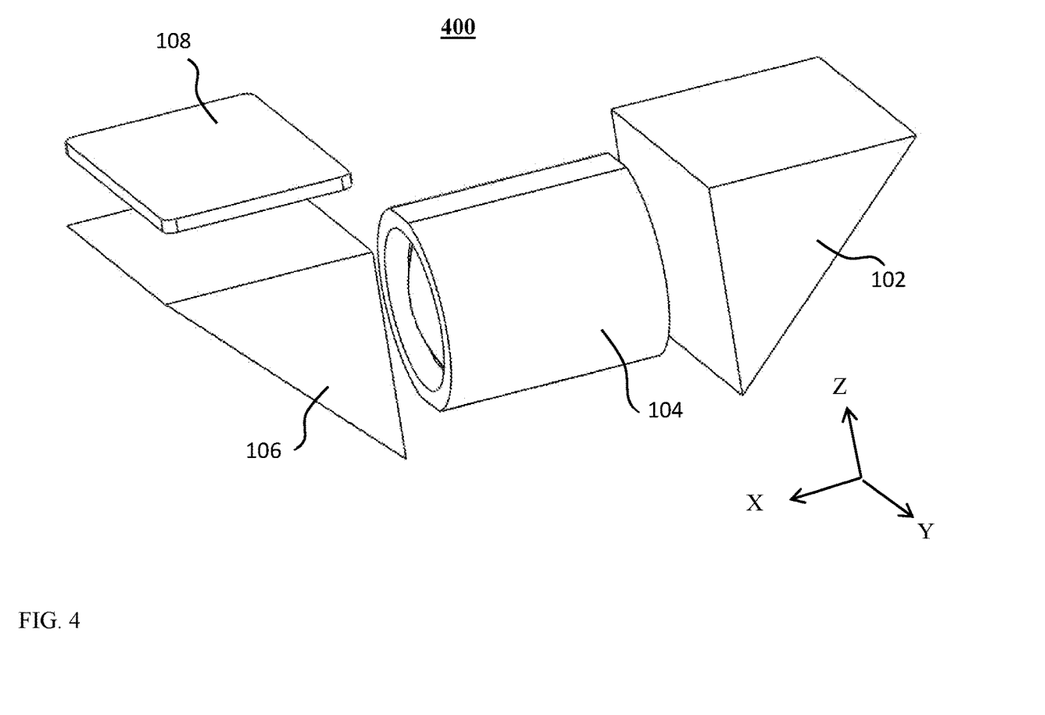
FIG. 4 shows schematically another DFC design in a general perspective view, according to an example of the presently disclosed subject matter.

In DFC 100, second OPFE 106 folds the optical path to a direction away from the object side (negative Z direction in the coordinate system given), with image sensor 108 being in the negative Z direction relative to OPFE 106. However, this is not mandatory, and the folding by OPFE 106 can be done in the opposite direction (closer to the object side). This configuration is presented in FIG. 4, showing a DFC 400 having all the elements with the same numbering and functionality as DFC 100, except that image sensor 108 is in the positive Z direction relative to OPFE 106. All the analysis above and below applies for such a case. The first and third optical paths (112 and 116) are substantially parallel. Second optical path 114 is orthogonal to the first and third optical paths (112 and 116). In the XYZ coordinate system used in all figures, the first and third optical paths (112 and 116) lie along the Z axis, while second optical path 114 lies along the X axis. The Y axis is perpendicular to the first, second and third optical paths. DFC 100 can thus capture images on image sensor 108 from objects that lie generally in planes substantially orthogonal to the first optical path. Image sensor 108 outputs an output image. The output image may be processed by an image signal processor (ISP—not shown) for demosaicing, white balance, lens shading correction, bad pixel correction and other processes known in the art of ISP design.

In DFC 100, several elements may be actuated (i.e. moved or shifted linearly). Actuation directions for lens 104 and second OPFE 106 are marked by dashed arrows in FIG. 1C (as well as in FIGS. 2C and 3C). Lens 104 may be actuated in plane XY. Shifting lens 104 in the X direction (along lens optical axis 110) may change the focus position of the system. Shifting lens 104 in the Y direction (a direction orthogonal to both lens optical axis 110 and first optical path 112) shifts the image on image sensor 108 in the Y direction. Shifting the image on the image sensor in the Y direction may be used to create OIS, which corrects for tilt of DFC 100 around the X axis (also referred to as "correction of a first tilt" of the DFC). Second OPFE 106 may be also actuated in the X direction. Shifting second OPFE 106 in the X direction creates two effects simultaneously: the first effect is to change the focus plane of the system (i.e. change the distance from the camera of a plane which is focused on the image sensor); the second effect is to shift the image on the sensor in the X direction. Shifting the image on the image sensor in the X direction may be used to create OIS to correct tilt of DFC 100 around the Y axis also referred to as "correction of a second tilt" of the DFC). In total, the actuation and movements described above provide 3 degrees of freedom (DOF) (shifting the lens in the X direction, shifting the lens in the Y direction, and shifting the second OPFE in the X direction) which may be used for three optical effects: focusing and OIS in two directions, as indicated in Table 1. To clarify, $\alpha$ and $\beta$ in Table 1 are respectively the "first tilt" and the "second tilt" of the camera. Therefore, the three optical effects can be achieved as a linear sum of 3-movement DOF (i.e. movement in 3 DOFs) described herein.

TABLE 1

| Desired optical effect | Actuation |
| --- | --- |
| Focus shift, A μm | Lens 104 shift X direction, A μm |
| Correction of a first tilt, $\alpha$ radians | Lens 104 shift Y direction, EFL × tan($\alpha$) |
| Correction of a second tilt, $\beta$ radians | OPFE 106 shift X direction, EFL × tan($\beta$) + Lens 104 shift X direction, EFL × tan($\beta$) |

Actuation methods for actuating a lens in two directions (i.e. X and Y in FIG. 1C) are known. Such actuation may be performed using voice coil motors (VCMs), as described for example in co-owned international patent applications PCT/IB2016/052143, PCT/IB2016/052179 and PCT/IB2017/054088. Actuation of any optical element in one direction is also known, for example as described in U.S. Pat. No. 8,810,714. Other actuation methods may include use of stepper motors, shape memory alloy motors, piezo electric motors, micro-electro-mechanical system (MEMS) motors, etc.

Figure 2A:
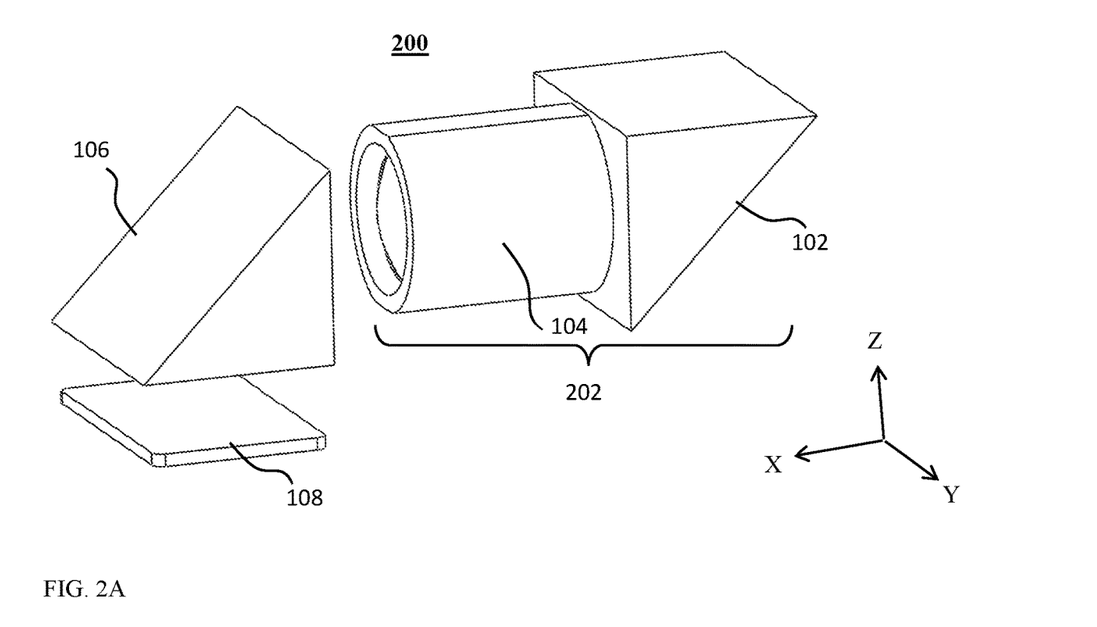
FIG. 2A shows schematically a double-folded camera (DFC) in a general perspective view, according to another example of the presently disclosed subject matter.
Figure 2B:
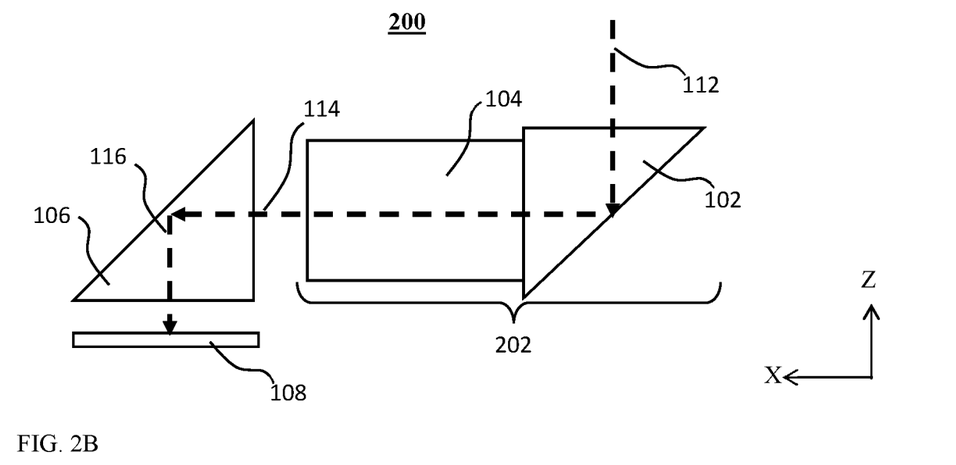
FIG. 2B shows the DFC of FIG. 2A from a side view.
Figure 2C:
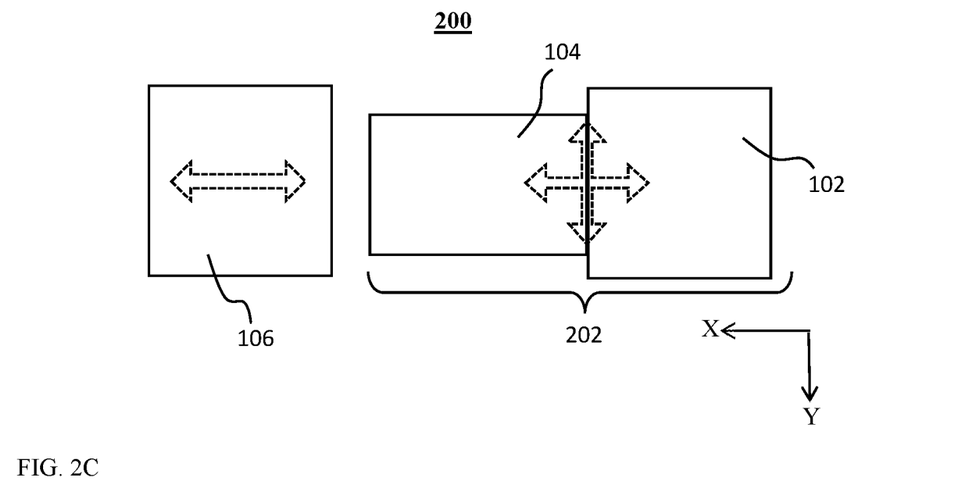
FIG. 2C shows the DFC of FIG. 2A from a top view.

FIGS. 2A, 2B and 2C show respectively schematic perspective, side and top views of a DFC numbered 200 according to another example of the presently disclosed subject matter. DFC 200 includes the same elements as DFC 100, numbered with the same numerals. In DFC 200, first OPFE 102 and lens 104 are made as one (integrated) part, i.e. form a lens-prism assembly 202. Lens-prism assembly 202 may be actuated like lens 104 in DFC 100 i.e. in plane X-Y along X direction and/or along Y direction. The actuation of lens-prism assembly 202 in plane X-Y has to a good approximation (less than 1-5 percent of the effect) the same optical effect as that of the actuation of lens 104 in plane X-Y in camera 100. In DFC 200, second OPFE 106 may be shifted in the same direction and with the same optical effects as in DFC 100. Therefore, in system 200, the three optical effects can also be achieved as a linear sum of 3-movement DOF described herein.

Figure 3A:
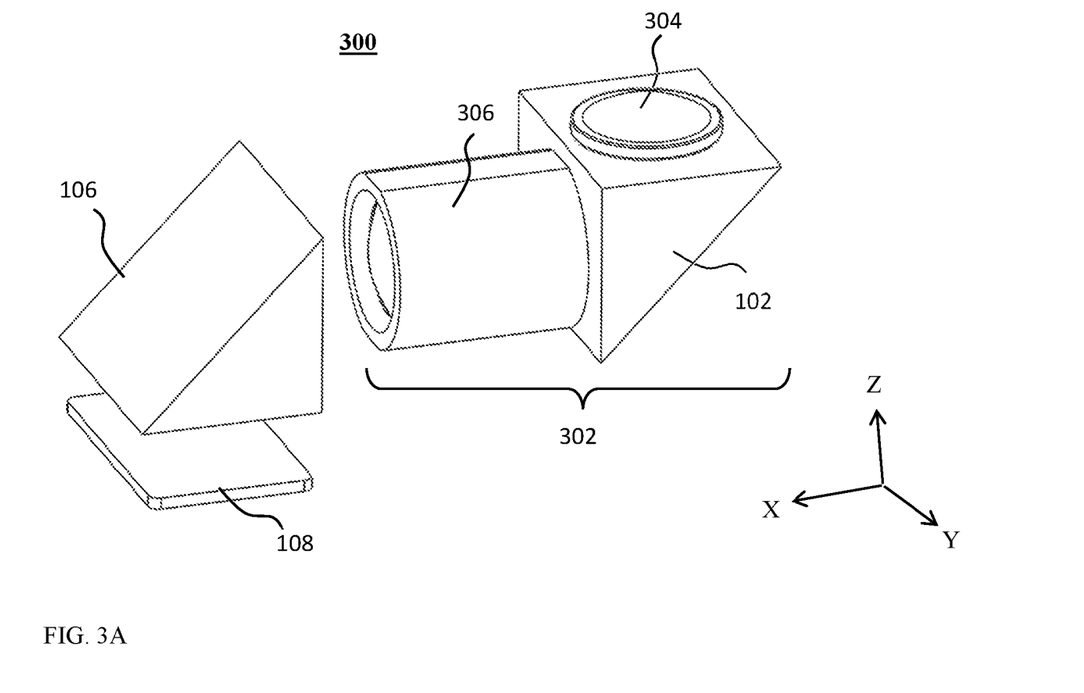
FIG. 3A shows schematically a double-folded camera (DFC) in a general perspective view, according to yet another example of the presently disclosed subject matter.
Figure 3B:
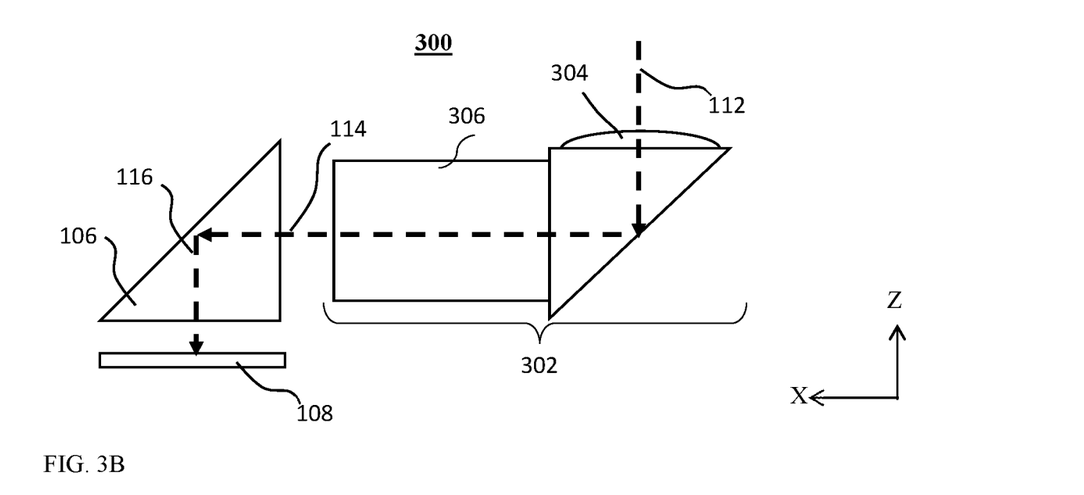
FIG. 3B shows the DFC of FIG. 3A from a side view.
Figure 3C:
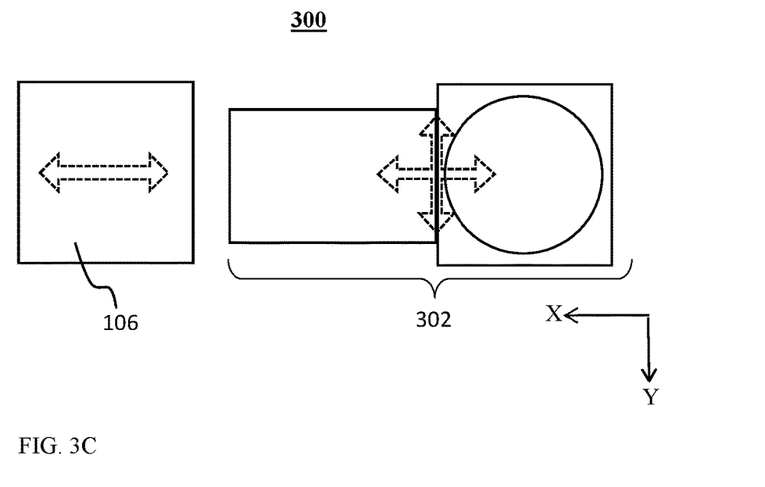
FIG. 3C shows the DFC of FIG. 3A from a top view.

FIGS. 3A, 3B and 3C show respectively schematic perspective, side and top views of a DFC numbered 300 according to yet another example of the presently disclosed subject matter. DFC 300 is similar to DFC 200, except that lens-prism assembly 202 is replaced by a folded lens 302. Folded lens 302 is a distributed (split) folded lens in the sense defined above: it includes a plurality of lens elements and the first OPFE, wherein some of the lens elements (for example, one lens element 304) are positioned before the OPFE in first optical path 112, while one or more other lens elements are positioned after the OPFE in second optical path 114, being for example included in a barrel 306. An example of design of folded lens 302 may be seen in co-owned U.S. patent application Ser. No. 16/310,690. Folded lens 302 serves with the same optical properties of lens-prism assembly 202. Folded lens 302 may be actuated like lens 104 in DFC 100 and lens-prism assembly 202 in DFC 200, i.e. in plane X-Y along X direction and/or along Y direction. The actuation of folded lens 302 in plane X-Y has the same optical effect as the actuation of lens-prism assembly 202 in plane X-Y in DFC lens-prism assembly 202. In DFC 300, second OPFE 106 may be shifted with the same direction and same optical effects as in DFC 100. Therefore, in system 300, the three optical effects can also be achieved as a linear sum of 3-movement DOF described herein.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present invention.

What is claimed is:

1. A digital camera, comprising:
    a) a split lens including a plurality of lens elements divided into at least one lens element along a first optical axis and one or more lens elements along a second optical axis perpendicular to the first optical axis, the split lens including a first optical path folding element (OPFE) for folding light arriving in a first optical path along the first optical axis to light propagating in a second optical path along the second optical axis;
    c) an image sensor; and
    b) a second OPFE for folding the light propagating in the second optical path to light propagating in a third optical path toward the image sensor, wherein the third optical path is parallel with the first optical path,
    wherein the first and third optical paths are orthogonal to the second optical path, wherein the split lens is configured to move together including all lens elements therein as a single integrated assembly in a first direction parallel to the second optical axis and in a second direction perpendicular to both the first and second optical paths, and wherein the motion of the integrated assembly is operative to provide focus and to compensate for tilt of the camera around the first direction.

2. The digital camera of claim 1, wherein the second OPFE is operative to move in the first direction to compensate for tilt of the camera around the second direction.

3. The digital camera of claim 1, wherein the second OPFE is operative to move in the first direction to provide focus.

4. The digital camera of claim 1, wherein the second OPFE and the integrated assembly are configured to move in the first direction to compensate for tilt of the camera around the second direction.

5. The digital camera of claim 1, wherein the at least one lens element along the first optical axis is a single lens element.

6. The digital camera of claim 1, wherein the at least one lens element and/or the one or more lens elements are fixedly attached to the first OPFE.

7. The digital camera of claim 1, wherein the first and/or second OPFE are prisms.

8. The digital camera of claim 2, wherein the at least one lens element and/or the one or more lens elements are fixedly attached to the first OPFE.

9. The digital camera of claim 2, wherein the first and/or second OPFE are prisms.

10. The digital camera of claim 1, wherein the motion is actuated by a voice coil motor.

11. The digital camera of claim 1, wherein the digital camera is included in a smartphone.

* * * * *